United States Patent [19]

Atkinson

[11] 4,346,548
[45] Aug. 31, 1982

[54] ATTACHMENT FOR A HARVESTER FOR PICKING UP DOWNED CORN STALKS

[76] Inventor: Cecil G. Atkinson, White City, Kans. 66872

[21] Appl. No.: 252,156

[22] Filed: Apr. 8, 1981

[51] Int. Cl.³ ...................... A01D 45/02; A01D 75/00
[52] U.S. Cl. .......................................... 56/119; 56/98
[58] Field of Search ............... 56/119, 98, 94, 109, 56/111, 105, 106

[56] References Cited

U.S. PATENT DOCUMENTS

| | | | |
|---|---|---|---|
| 535,228 | 3/1895 | Steiner | 56/111 |
| 1,219,327 | 3/1917 | Keeler | 56/106 |
| 1,306,317 | 6/1919 | St. John | 56/111 |
| 1,826,551 | 10/1931 | Krenzel | 56/59 |
| 1,928,868 | 10/1933 | Poen | 56/119 |
| 2,648,942 | 8/1953 | Grant et al. | 56/143 |
| 3,031,832 | 5/1962 | Siefried | 56/111 |
| 3,331,196 | 7/1967 | Grant | 56/98 |
| 3,584,444 | 6/1971 | Sammann et al. | 56/119 |
| 3,596,448 | 8/1971 | Boskirk | 56/63 |
| 3,646,737 | 3/1972 | Grant | 56/106 |
| 3,807,152 | 4/1974 | Storm et al. | 56/98 |
| 4,048,792 | 9/1977 | Shriver et al. | 56/98 |
| 4,084,396 | 4/1978 | Fritz et al. | 56/98 |
| 4,137,695 | 2/1979 | Sammann | 56/106 |
| 4,160,355 | 7/1979 | Blake et al. | 56/98 |
| 4,215,527 | 8/1980 | Schrubb et al. | 56/98 |

*Primary Examiner*—Paul J. Hirsch
*Attorney, Agent, or Firm*—Blair, Brown & Kreten

[57] ABSTRACT

An attachment for a harvester for picking up and combining downed corn stalks or the like in which the harvester is of the type having a plurality of inner dividers and two outer dividers, all with tapered snouts between which throats are provided defining entrances to the combine for upright rows of corn to pass therethrough. The device includes rollers carried on a top surface of the outer dividers and a plurality of chains having flexible outwardly extending fingers carried on the chain and driven, these chains being disposed on the top surface of the inner dividers and a driving arrangement which simultaneously drives both the rollers and chains so that corn stalks or similar articles which are downed or bent over can engage these rollers and chains and be lifted upwardly and directed to the corn stalk throat entrance of the combine for further processing.

10 Claims, 5 Drawing Figures

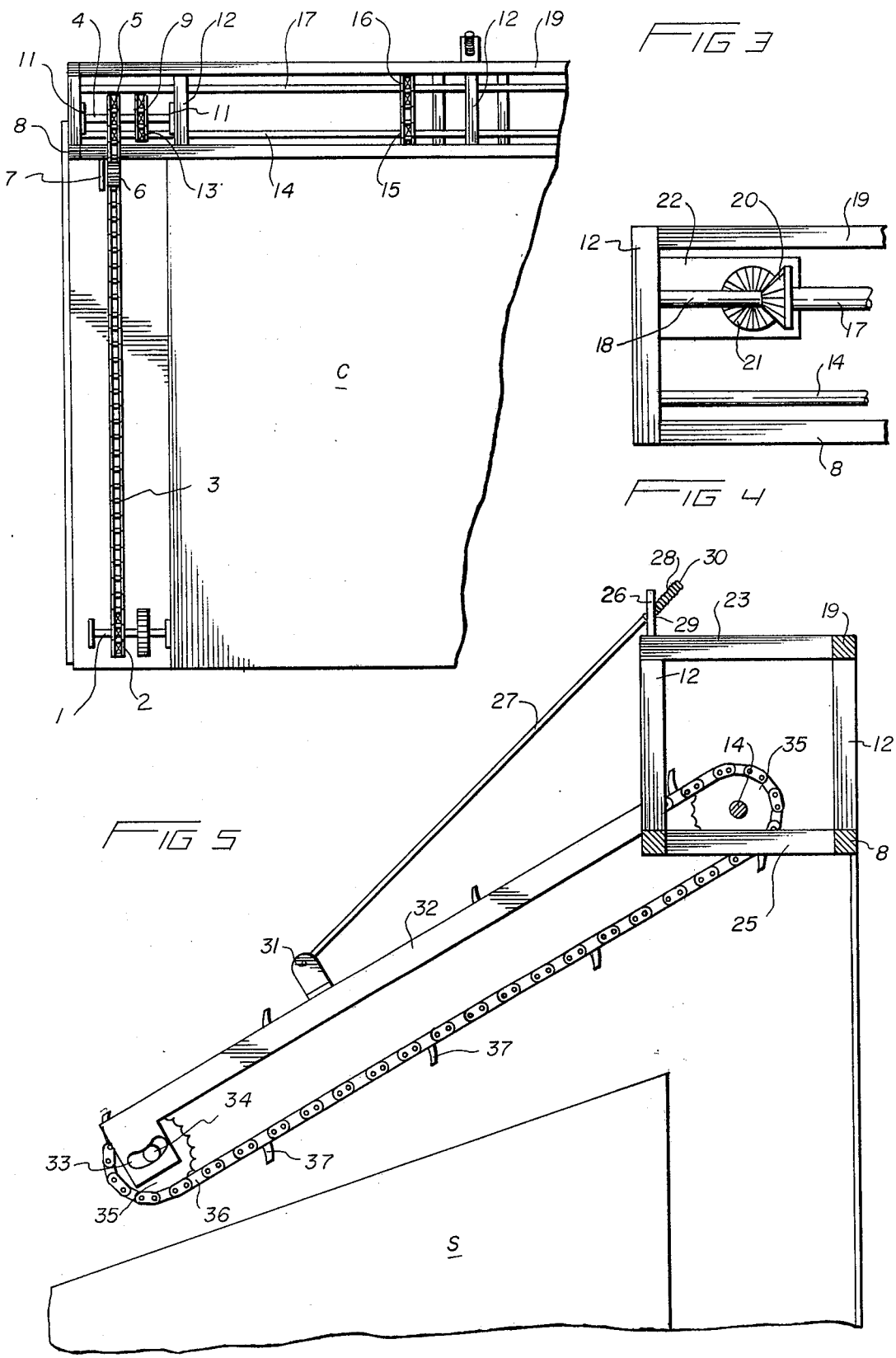

ATTACHMENT FOR A HARVESTER FOR PICKING UP DOWNED CORN STALKS

BACKGROUND OF THE INVENTION

Mechanization of agricultural equipment has produced on the one hand the ability for a single person to cultivate vast areas of land, but on the other hand has also provided the single operator with the inability to efficiently cull all of the produce off of the acreage due to limitations within the machinery itself.

An example of this phenomena would be the agricultural endeavors in the corn belt in which combines start in the southern most areas of the belt and work their way northward, processing enormous amounts of grain heretofore beyond the manipulative scope of a single person. Unfortunately, machines of this type have not heretofore satisfactorily addressed the problems associated with engaging corn stalks which are not in a vertically upright position, and therefore can not enter within the throat area of the harvestor which leads to an entrance for taking the stalk and removing the ears. It is to be noted that the throat and entrance areaways are relatively laterally spaced from each other to correspond to the planting distance of rows of corn. Not surprisingly therefore ears of corn and their stalks which have been bent downwardly due to wind, or other types of phenomena would merely go under the machine and not be processed.

While heretofore the downed corn has traditionally remained unharvested, providing an ideal feeding area for wild game, conservation of resources and spiraling prices has required that this downed corn be harvested so as to increase the yield per acre. The inventor has found that by use of the attachment according to the instant application, an additional 15 to 20 bushels per acre of downed corn can be retrieved and possibly more.

Moreover, in fields where rain and wind damage have caused an entire field to bend over, in order to salvage any of the crop, it is frequently necessary to either have the operator of the combine stop it and walk in front of the machine and attempt to feed the stalks into the combine manually, an exceedingly dangerous task and extremely time consuming. The inventor personally has spent a week combining only seven acres of downed corn and frequently getting off the combine risking a chance of getting caught within the machine. With the attachment, the inventor has combined 80 acres in a shorter amount of time and had gotten off the combine only one time.

The following patents reflect the state of the art of which applicant is aware in so far as these references appear germane to the Patent process:
U.S. Pat. No. 1,826,551 Krenzel;
U.S. Pat. No. 2,648,942 Grant et al.;
U.S. Pat. No. 3,331,196 Grant;
U.S. Pat. No. 3,807,152 Storm et al.
U.S. Pat. No. 4,048,792 Shriver et al.
U.S. Pat. No. 4,160,355 Blake et al.

The Grant Patent is seen to be relevant in that it shows a corn head attachment to a harvestor in which chains having upstanding lugs are provided on the upper surfaces of all dividers including the outside dividers for handling down corn.

The Shriver et al. patent and Storm et al. patent each teach the use of a roller placed on the outermost dividers for facilitating the harvesting of down corn. The remaining references appear to be of general interest, merely showing structure having isolated elements that may share coincidental similarity with the instant application.

By way of contrast, none of these references teach singularly nor render obvious in combination the provision of chains with lugs on top of the divider being flexibly disposed and including elongate rollers on the outermost divider, all of which are driven from a unitary drive system, and suitably fashioned for attachment to any of a plurality of harvestors. The rollers according to the instant application are directed to roll inwardly toward the center portion of the machine to encourage downed stalks to migrate into the harvesting area, and in combination with the chains having upwardly extending resilient fingers to urge the corn stalks up off the ground and toward the throat and entrance ways of the combine allow for a uniform harvesting of substantially all of the corn in the field.

OBJECTS AND SUMMARY OF THE INVENTION

Accordingly, this invention has as an object the provision of an attachment to a harvester used to harvest row crops such as corn or the like in which a pair of elongate rollers are provided along the outside dividers of the conventional combine, the rollers adapted to rotate inwardly toward the central area of the combine, in combination with a plurality of longitudinally extending chains disposed on inner or intermediate dividers having upwardly extending fingers thereon of flexible construction to urge downed corn stalks and the like into the throat and entrance way of the combine.

It is a further object of this invention to provide a device of the character described above in which both the rollers and the chain drive share a single common unitary power source.

It is still a further object of this invention to provide a device of the character described above in which the power source is taken from the combine itself.

Still a further object of this invention is to provide a device of the character described above in which the harvesting of corn and the like can provide higher yields per acre than the prior art would suggest.

It is still a further object of this invention to provide a device of the character described above in which the safety of the combine operator has been enhanced by not requiring his getting out of the combine to manipulate the hand feeding of downed corn stalks into a machine which may be dangerous.

It is still a further object of this invention to provide a device of the character described above which is capable of attachment to a plurality of different styles of combines.

It is yet a further object of this invention to provide a device of the character described above in which the attachment means to the combine is extremely simple, the attachment is of durable construction, lends itself to mass production techniques, and it is extremely safe and durable to use.

These and other objects will be made manifest when considering the following detailed specification when taken in conjunction with the appended drawing figures in which there is provided an attachment for a harvestor for picking up and combining downed corn stalks or the like in which the harvestor is of the type having a plurality of inner dividers and two outer dividers, all with tapered snouts between which throats are provided defining entrances to the combine for upright rows of corn to pass therethrough, comprising roller means carried on top surfaces of the outer dividers, chain means having outwardly extending flexible finger means carried on a top surface of the inner dividers, and a single solitary drive means extending from a power takeoff of the harvestor to operatively run the roller means and chain means whereby upright corn stalks pass into the combine through the throat areas unaffected, but downed and bent over corn stalks or the like are lifted up and directed to the corn stalk entrance of the combine.

BRIEF DESCRIPTION OF THE DRAWING FIGURES

FIG. 3 is a fragmentary view of the lefthand corner of a rear portion of that which is shown in FIGS. 1 and 2;

FIG. 4 is a further framentary view of the same corner showing details of structure behind that which is shown in FIG. 3; and FIG. 5 is a sectional view taken along lines 5—5 of FIG. 2.

BRIEF DESCRIPTION OF THE PREFERRED EMBODIMENT

Figure 1:
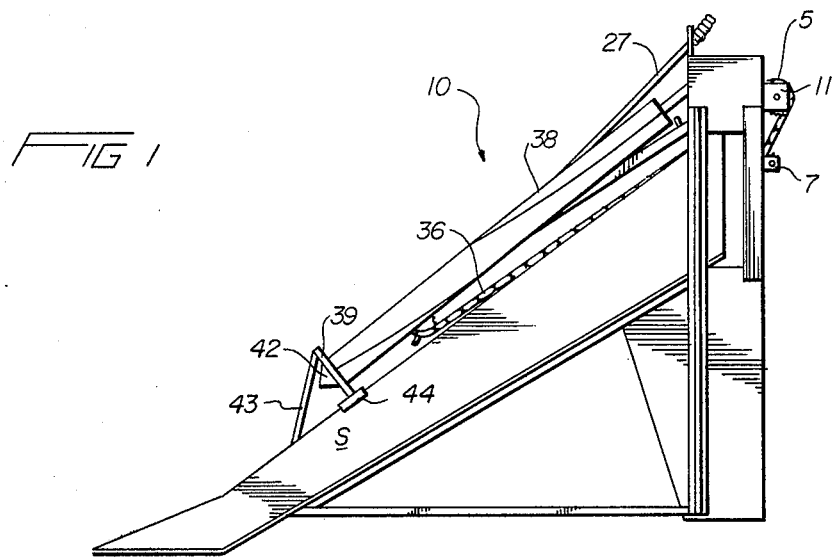
FIG. 1 is a side view of the apparatus according to the present invention.

Referring to the drawings now wherein like reference numerals refer to like parts throughout the various drawing figures, reference numeral 10 is directed to the attachment for a harvester according to the present invention.

The attachment 10 includes roller means 38 carried on a top surface of the outer dividers S, and the inner dividers S' each have chains depending at one end from a frame mechanism to be defined hereinafter extending along the longitudinal extent of the inner dividers and further depending from a support rod 27 as will also be explained.

The traditional combine is provided with a plurality of downwardly extending tapered snouts so that the areas of convergence of adjacent dividers defined throat areas T which thereafter include a longitudinally elongate entrance way through which corn normally disposed in rows and upstanding will pass for the processing.

However, downed ears of corn that are brought up above the snout of the dividers will be caused to be elevated and returned to an upright condition by means of their engagement with fingers 37 on the chains 36, or, for the outside dividers, be urged inwardly by the rollers 38 rotation in the direction of the arrows A to urge the bent over or downed corn stalks into the central area of the machine.

FIG. 3 shows a rear portion of the combine C which has an extension 1 of the power shaft therewithin upon which is provided a mechanical linkage that extends from the power shaft 1 to an intermediate shaft 4. The mechanical linkage in this case and all cases to be described hereinafter in the preferred form comprises sprocket 2, 5 interconnected by means of a chain 3 as best shown in the drawings. An idler sprocket 6 (FIGS. 3 and 1) provides appropriate tensioning on the chain, and the idler sprocket 6 is supported on the frame by means of an outwardly extending tab 7.

The intermediate shaft 4 has fixedly mounted thereon a second sprocket 9 which drives a driven shaft 14 by means of a further mechanical linkage, perferably another sprocket 13 and chain mechanism, in one preferred form, or two meshing gears. As suggested in the drawings, the intermediate shaft 4 is suitably supported on a frame by means of laterally spaced support plates 11 having apertured center 3 for admission therein of the intermediate shaft and bearings.

The driven shaft 14 in turn is shown in FIG. 3 as driving the roller shaft 17, 18 to be described hereinafter, but as in the previous discussed cases the preferred method of interconnection is by sprockets 15, 16 and a chain.

The frame supporting this drive network is comprised of two pairs of laterally extending bars 8, 19, lower and upper respectively and interbraced by means of upper and lower cross bars 23, 25 and vertically suspended and supported one to the other by means of vertical support bars 12. Bearings carry all of the shafts in a relatively frictionless environment, and the actual operating and mechanical features of the attachment can now be discussed.

Referring to FIG. 4, an outer end of the roller shaft 18 is dimensioned somewhat less than the inner portion 17 of the shaft so that the inter engagement of the beveled gear 21, carried on a spindle 41 of the roller 38 and the beveled gear 20 carried on the roller shaft 18 will tend not to work away from each other. The beveled gear 21 and its associated spindle 41 are carried by a plate 22 supported on the frame at one extremity, and by means of a lowermost collar 39 supported on the divider S by means of plate 44. A deflector rod 43 of any suitable configuration extends from the collar 39 to the divider, and whereas the roller is shown as terminating at a point 42, it can be of any tapering configuration in conjunction with the support 43 to serve as an inducement for the downed corn to ride thereup. The rollers rotate inwardly as suggested by the arrows A in FIG. 2 so that downed corn stalks will be urged inwardly to the combine for harvesting. Vanes 51 on rollers 41 assume a spiral form and assist in directing the stalks.

Figure 2:
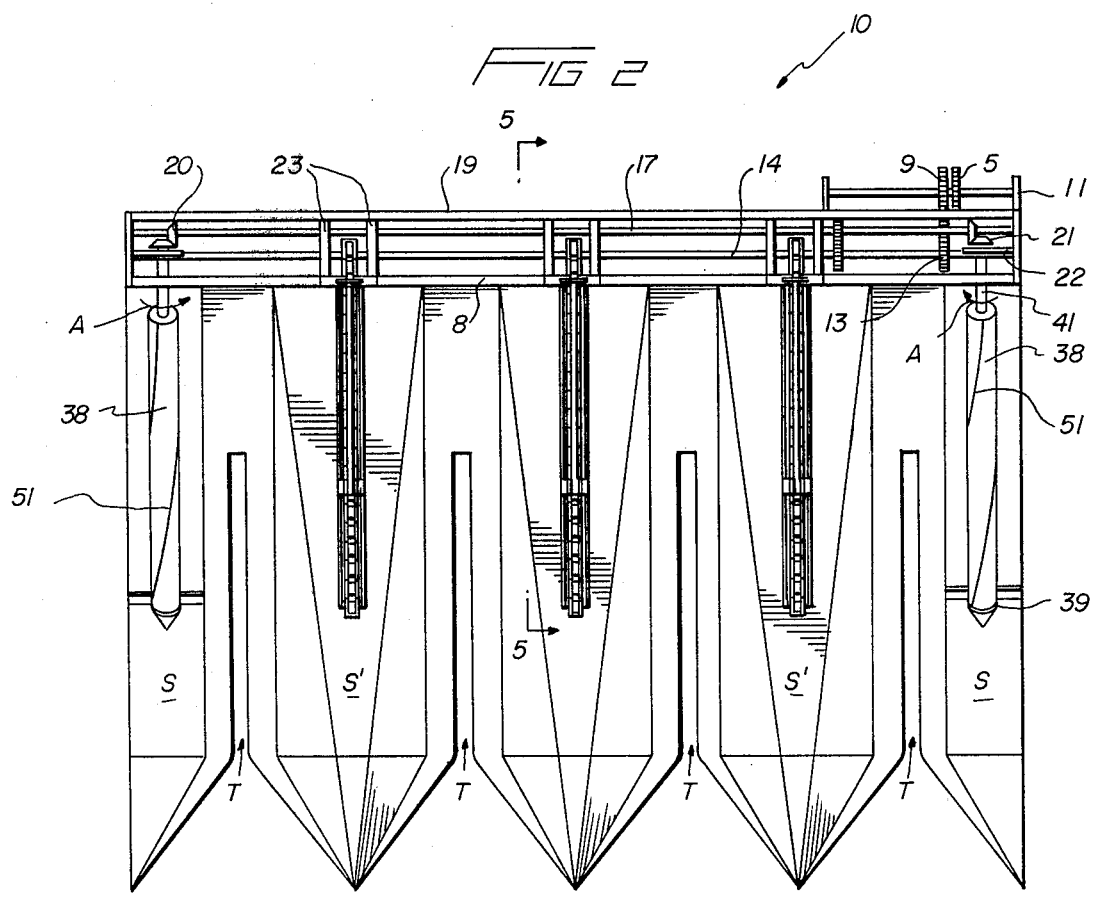
FIG. 2 is a top plan view thereof.

The chain means disposed upon the inner dividers can now be defined. A top portion of the frame 23 has extending upwardly therefrom an apertured plate 26 through which a rod 27 passes. The uppermost extremity of the rod 27 is provided with a spring 28 and a spacer 29 to the right of member 26 and a nut 30 firmly affixed on the end so that a resilience is provided in the rod within the limits of the spring tension. The lowermost extent of the support rod 27 terminates in a downwardly extending bifurcated block 31 which is operatively fixed to a guard 32. As shown in FIG. 2, the guard 32 has on its elongate top face thereof an open groove to allow upward deployment of the resilient fingers 37 rotatably carried upon the chain 36. The lowermost extremity of the guard 32 carries a sprocket 35 by means of a pulley block 33 on axle 34. The uppermost end of the chain mechanism is rotatably carried on the driven shaft 14 by means of a second sprocket 35.

In use and operation therefore those corn stalks entering into the combine which are vertically upright will be sufficiently spaced to address the throat area of the combine in the traditional manner thereafter entering the combine for the processing. Downed corn, while heretofore being just driven over, will be urged upwardly and directed inwardly to the combine to increase the yield rate per acre for the land.